United States Patent
Taniguchi

(10) Patent No.: US 11,524,704 B2
(45) Date of Patent: Dec. 13, 2022

(54) VEHICLE TRAVEL CONTROL METHOD AND TRAVEL CONTROL DEVICE

(71) Applicants: Nissan Motor Co., Ltd., Yokohama (JP); Renault S.A.S., Boulogne-Billancourt (FR)

(72) Inventor: Hiroki Taniguchi, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 17/618,247

(22) PCT Filed: Jun. 14, 2019

(86) PCT No.: PCT/IB2019/000625
§ 371 (c)(1),
(2) Date: Dec. 10, 2021

(87) PCT Pub. No.: WO2020/249993
PCT Pub. Date: Dec. 17, 2020

(65) Prior Publication Data
US 2022/0204053 A1    Jun. 30, 2022

(51) Int. Cl.
*B60W 60/00* (2020.01)
*B60W 40/114* (2012.01)

(52) U.S. Cl.
CPC .... *B60W 60/00272* (2020.02); *B60W 40/114* (2013.01); *B60W 60/00274* (2020.02); *B60W 2420/42* (2013.01); *B60W 2552/53* (2020.02); *B60W 2554/4041* (2020.02); *B60W 2554/4049* (2020.02)

(58) Field of Classification Search
CPC ......... B60W 30/18163; B60W 40/114; B60W 60/00272; B60W 60/00274; B60W 2420/42; B60W 2552/53; B60W 2554/4041; B60W 2554/4049
See application file for complete search history.

(56) References Cited

U.S. PATENT DOCUMENTS

2016/0304097 A1    10/2016 Taira et al.
2018/0162396 A1    6/2018 Ibuka et al.
(Continued)

FOREIGN PATENT DOCUMENTS

JP    H10-105880 A    4/1998
JP    2006-252533 A    9/2006
(Continued)

*Primary Examiner* — Anshul Sood
(74) *Attorney, Agent, or Firm* — Young Basile Hanlon & MacFarlane, P.C.

(57) ABSTRACT

The travel control device, when determining that the traffic congestion is occurred in the other lane, detects, behind another vehicle in the other lane, an approach space; determines whether the approach space meets a predetermined condition; when determining that the approach space meets the predetermined condition, sets the target posture of the own vehicle at the target position behind the other vehicle in the other lane based on the shape of the approach space; and generates a target traveling trajectory from a current position of the own vehicle to the target position. The travel control device controls the motion of the own vehicle so that the own vehicle tracks the target traveling trajectory.

19 Claims, 12 Drawing Sheets

(56) References Cited

U.S. PATENT DOCUMENTS

| | | | |
|---|---|---|---|
| 2019/0276027 A1* | 9/2019 | Toda | B60W 40/04 |
| 2021/0114595 A1* | 4/2021 | Uematsu | B60W 30/095 |
| 2022/0135039 A1* | 5/2022 | Jardine | B60W 30/18159 701/26 |

FOREIGN PATENT DOCUMENTS

| | | |
|---|---|---|
| JP | 2016-203745 A | 12/2016 |
| JP | 2017-001596 A | 1/2017 |
| JP | 2018-094960 A | 6/2018 |
| WO | 2017/047261 A1 | 3/2017 |
| WO | 2018/070015 A1 | 4/2018 |

* cited by examiner

VEHICLE TRAVEL CONTROL METHOD AND TRAVEL CONTROL DEVICE

TECHNICAL FIELD

The present invention relates to a travel control method for a vehicle and a travel control device for a vehicle for controlling a motion of an own vehicle capable of autonomous traveling.

BACKGROUND

When another lane such as a branch exists in the planned traveling route of the own vehicle, a traffic congestion may occur in the branch, and the last end of the traffic congestion line may come to the vicinity of the entrance of the branch. A travel control device described in JP2018-94960A, when the vehicle of the traffic congestion line is overflowing from the branch entrance to the adjacent lane, mitigates the off-road deviation suppression control of the own vehicle and make the own vehicle closer to the road shoulder control so as to follow the end of the traffic congestion line.

SUMMARY

However, in JP2018-94960A, although it is assumed that the traffic congestion line overflows from the entrance of the branch route, various congestion situations that may occur on the branch route are not assumed. For example, in JP2018-94960A, it is not considered that although the tail end of the traffic congestion line is not overflowing from the branch entrance, a part of the vehicle body at the rear position protrudes into the adjacent traveling lane or the own vehicle cannot enter the branch without inclining a direction of the vehicle body because the space where the own vehicle can enter the branch is too small. Therefore, it is possible that the own vehicle cannot travel properly in accordance with the actual traffic congestion situation of anther lane to which the own vehicle changes lanes, when the vehicle changes lanes.

A problem to be solved by the present invention is to provide a travel control method and a travel control device controlling the motion of the own vehicle according to various congestion conditions that may occur in another lane to which the own vehicle changes lanes.

The present invention solves the above-described problems by detecting an approach space existing behind another vehicle in the other lane when determining that a traffic congestion is occurred in another lane on the planned traveling route, and setting a target posture of the own vehicle at the target position based on the shape of the approach space when determining that the shape of the approach space meets the predetermined condition.

The present invention sets the target posture of the own vehicle arranged behind the traffic congestion line in another lane according to the condition of the approach space to the other lane on the planned traveling route, and so it is possible to control the motion of the own vehicle according to the various situations of traffic congestion that may occur in another lane of the lane changing destination.

DETAILED DESCRIPTION

Hereinafter, embodiments of the present invention will be described with reference to the drawings.

First Embodiment

A travel control device 100 for the vehicle according to the first embodiment and a travel control method for a vehicle by the travel control device 100 will be described with reference to FIGS. 1 to 8.

Figure 1:
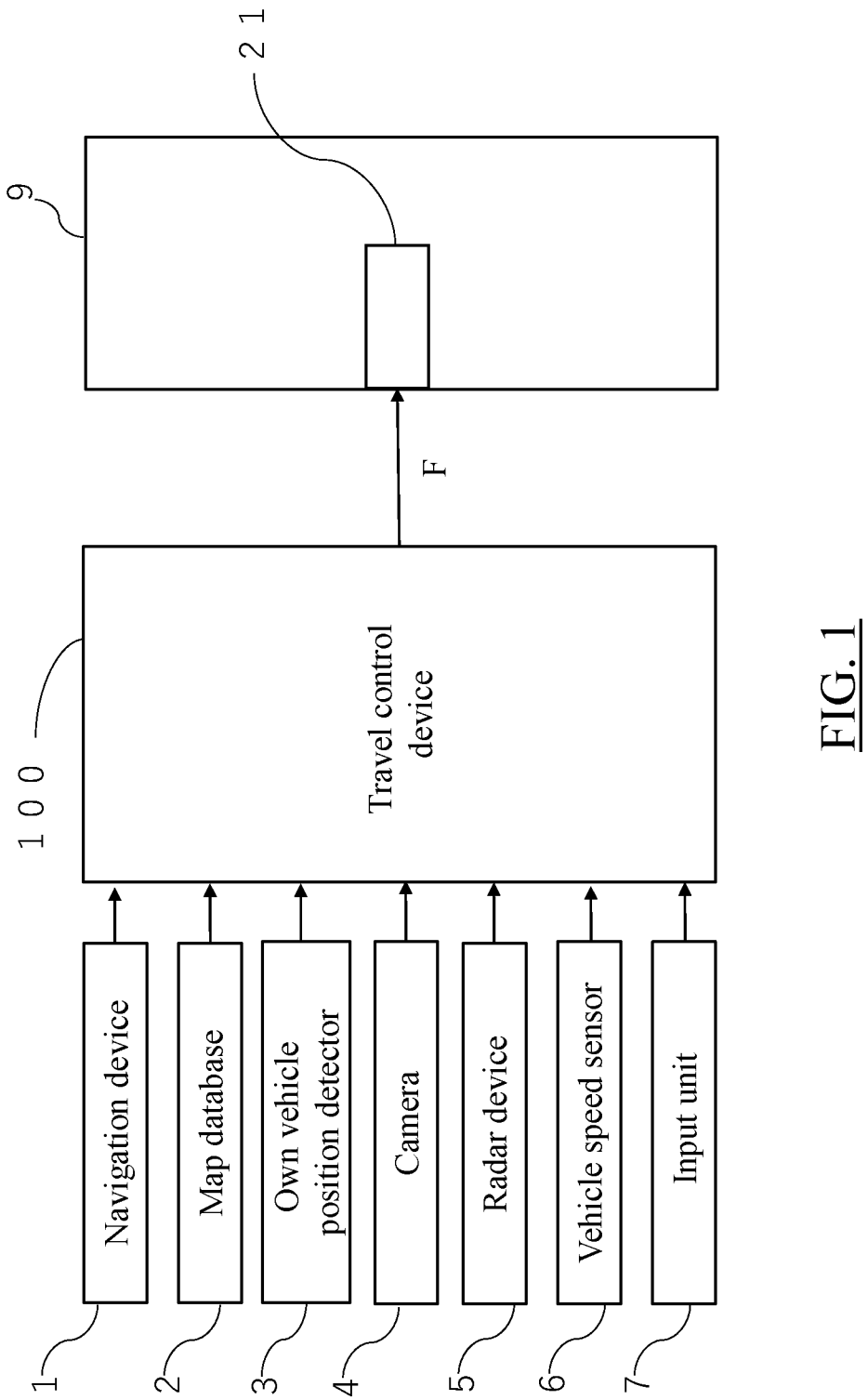
FIG. 1 is a block diagram showing a configuration of a travel control system including a travel control device according to a first embodiment of the present invention.

FIG. 1 is a block diagram showing a configuration of a travel control system 101 including a travel control device 100. Incidentally, the travel control method for the vehicle and the travel control device 100 for the vehicle according to the present invention are a travel control method and a travel control device to support the motion of the actuator 21 of the own vehicle 9 by a computer, based on the situation around the own vehicle 9 traveling autonomously.

The travel control device 100 is configured by one or a plurality of computers and software installed in the computers. The travel control device 100 includes a ROM that stores a program for executing automatic operation control for autonomously driving the own vehicle 9, a CPU that executes a program stored in the ROM, and a RAM that functions as an accessible storage device. In addition, as the operation circuits, an MPU, a DSP, an ASIC, an FPGA, and the like can be used instead of or together with the CPU.

The travel control device 100 calculates and determines a target traveling trajectory of the own vehicle 9 from the current position to the destination based on information from the navigation device 1, the map database 2, the own vehicle position detector 3, the camera 4, the radar device 5, the vehicle speed sensor 6, and the input unit 7. The target traveling trajectory determined by the travel control device 100 is output as data including one or more lanes, straight lines, curves having curvature or directions of travel, or a combination thereof. Furthermore, the travel control device 100, based on the information of the target traveling trajectory, calculates and outputs the control command value F to be output to the own vehicle 9 at predetermined time intervals. The travel control device 100 controls the motion of the actuator 21 of the own vehicle 9 based on the control command value F.

The navigation device 1 includes a display capable of displaying information on the current position of the own vehicle 9 and information such as a travel route to a destination, and a computer with programs for calculating traveling route according to selected route calculation modes based on the inputted destination and the current position detected by the own vehicle position detector 3

The map database 2 stores three-dimensional high-definition map information based on a road shape detected when the vehicle for data acquisition travels on an actual road. The three-dimensional high-definition map information stored in the map database 2 includes, in addition to the map information, border information, two-dimensional position information, three-dimensional position information, road information, road-attribute information, upstream information, downstream information, lane discrimination information, connection-destination lane information, and the like at the respective map coordinates. The road information and the road-attribute include information such as road widths, radii of curvature, road shoulder structures, road traffic regulations (speed limits, lane changes, etc.), road junction points, branch points, tollgates, lane count reduction points, service/parking areas, etc.

The own vehicle position detector 3 is composed of a GPS unit, a gyro sensor, and a vehicle speed sensor or the like. The own vehicle position detector 3 detects the radio waves transmitted from the plurality of satellite communications by the GPS unit and periodically acquires the position information of the own vehicle 9. The own vehicle position detector 3 periodically detects the current position information of the own vehicle 9 on the basis of the obtained position information of the own vehicle 9, the angle change information acquired from the gyro sensor, and the vehicle speed acquired from the vehicle speed sensor.

A camera 4 is composed of an image sensor such as a CCD wide-angle camera. The cameras 4 are provided in front, rear and both sides, if necessary, of the own vehicle 9. The camera 4 acquires image information by imaging the periphery of the own vehicle 9. The camera 4 may be a stereoscopic camera or an omnidirectional camera and may include a plurality of the image sensors. The camera 4 detects a road existing in front of the own vehicle 9 and structures, road signs, signs, other vehicles, motorcycles, bicycles, pedestrians, and the like of the roads surrounding the vehicle 9 as the surrounding conditions of the own vehicle 9 based on the acquired image data.

The radar device 5 is provided on the front, rear, and both sides of the own vehicle 9 and irradiates millimeter waves or ultrasonic waves to the periphery of the own vehicle 9 to scan a predetermined range around the own vehicle 9. The radar device 5 detects obstacles such as other vehicles, two-wheeled vehicles, bicycles, pedestrians, embankments of the road shoulders, guardrails, wall-surfaces, mound and the like existing around the own vehicle 9. For example, the radar device 5 detects the relative position (bearing) between the obstacle and the own vehicle 9, the relative speed of the obstacle, the distance from the own vehicle 9 to the obstacle, and the like as the surrounding situation of the own vehicle 9.

A vehicle speed sensor 6 measures the rotational speed of the driving system actuator of the own vehicle 9, such as a drive shaft, and detects the traveling speed of the own vehicle 9 based on this. The input unit 7 is composed of a mechanical switch, an electronic switch displayed on a display, and the like, and information input by a driver, such as a destination and the like and a decision as to whether or not to perform automatic driving.

Next, an outline of the overall control by the travel control device 100 will be described with reference to FIG. 2.

First, the travel control device 100 estimates the self-position based on the position information and the map information of the map database 2 of the own vehicle 9 obtained by the own vehicle position detector 3 (step S1). Further, the travel control device 100 recognizes pedestrians or other obstacles around the own vehicle 9 by the camera 4 and LRF5 (step S2). The information of the self-position estimated in step S1 and the information of the obstacle or the like recognized in step S2 are presented on the map information stored in the memory 2 (step S3).

Further, when a destination is input by the driver and an instruction to start autonomous driving control is input, the destination is set on the map information of the memory 2 (step S4), and route planning from the current location to the destination is performed (step S5). Actions of the own vehicle 9 is determined based on the map information (step S6). Specifically, for example, at each position of the plurality of intersections existing in the planned route, it is determined in which direction the own vehicle 9 turns or the like. Next, drive zone planning is performed on the map of the map database 2 based on information such as obstacles recognized by the camera 4 or the radar device 5 (step S7). Specifically, at a predetermined position or at predetermined intervals on the route, it is appropriately set which lane the own vehicle 9 should travel. Then, the travel control device 100 sets a target trajectory of the own vehicle 9 based on the position information of the entered current location and destination, the set route information, the information of the drive zone, the information of the obstacles recognized by the camera 4 and LRF5, and the like (step S8). Furthermore, the travel control device 100 controls motion of various actuators of the own vehicle 9 so that the own vehicle 9 tracks the target trajectory (step S9).

Next, based on the configuration of the travel control device 100 shown in FIG. 3, the procedure of controlling the motion of the own vehicle 9 in a branch at the time of traffic congestion will be described. The travel control device 100 includes a lane planning unit 10, a lane boundary acquisition unit 11, a branch determination unit 12, a surrounding situation detection unit 13, a traffic congestion determination unit 14, a lane boundary selection unit 15, an approach space detection unit 16a, an approach space determination unit 16b, a surrounding obstacle detection unit 17, a target posture setting unit 18, a target traveling trajectory generation unit 19, and a route tracking control unit 20.

Figure 2:
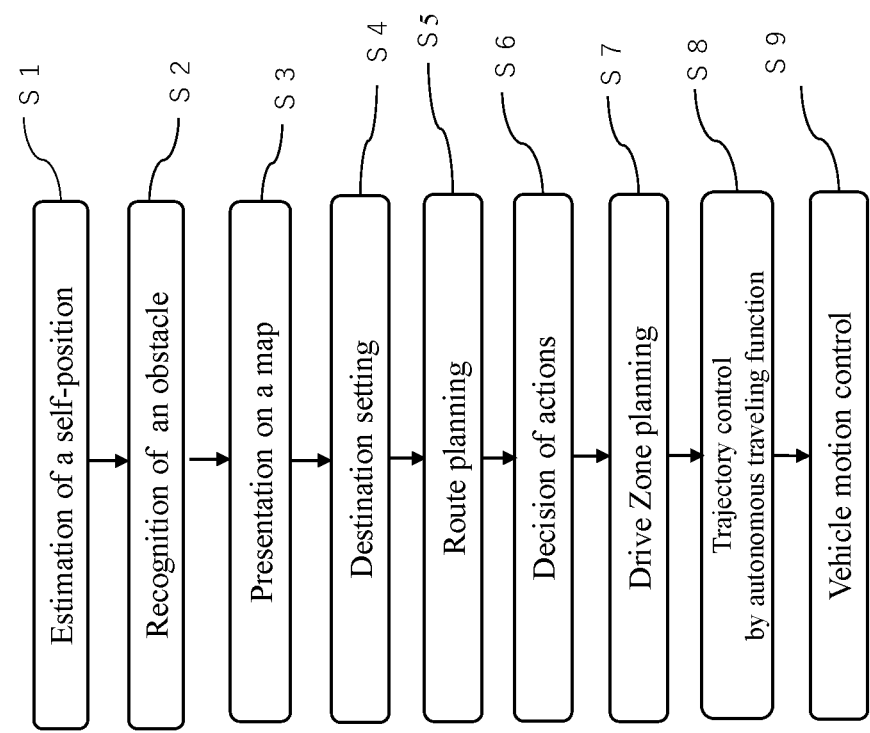
FIG. 2 is a flowchart showing an outline of the travel control method for the vehicle by the travel control device shown in FIG. 1.

First, the lane planning unit 10 of the travel control device 100 sets the lane plan of the own vehicle 9 based on the drive zone planned in Step S7 of FIG. 2. Based on this lane plan, the lane boundary acquisition unit 11 acquires the boundary of each lane of the planned traveling route that the own vehicle 9 should travel. The branch determination unit 12 determines whether or not there is a branch in the planned traveling route of the own vehicle 9. Incidentally, the branch determination unit 12 constitutes an other lane determination unit.

The surrounding situation detection unit 13 includes a camera 4 and a radar device 5 to detect the surrounding situation of the own vehicle 9 and the presence of other vehicles. When it is determined that there is a branch in the planned traveling route of the own vehicle 9, the traffic congestion determination unit 14 determines whether or not traffic congestion has occurred in the branch based on the presence of the other vehicles around the own vehicle 9 or the received traffic congestion data. The lane boundary selection unit 15 finally selects a lane in which the own vehicle 9 travels based on the boundary of each lane of the planned traveling route acquired by the lane boundary acquisition unit 11 and the traffic congestion situation of the branch determined by the traffic congestion determination unit 14.

The approach space detection unit 16a detects the approach spaces of the branches based on the shapes of the boundaries of the respective lanes of the planned traveling route selected by the lane boundary selection unit 15. The approach space is a space existing behind another vehicle that precedes the own vehicle 9 in another lane of the lane change destination, and the own vehicle 9 can enter the other lane through the approach space. For example, in the examples shown in FIGS. 5 to 8, the areas between the entrance boundary lines 35,135 of the branch 30 and the rear end 8a of the other vehicle 8 preceding the own vehicle 9 are defined as the approach spaces A1 to A4. Incidentally, each of the entrance boundary lines 35,135 is a boundary line for guiding the vehicle which is going to enter the branch 30 from the traveling lane 40 to the branch 30, at the branch portion between the branch 30 and the traveling lane 40. Further, the approach space determination unit 16b determines whether or not each of the approach spaces A1 to A4 meets a predetermined condition set in advance.

Here, the predetermined condition means, for example, that each of the approach spaces A1 to A4 includes a rearmost section having a predetermined interval or more. In the example shown in FIGS. 5 and 6, each of the rearmost sections L1 and L2 is a section between the rear end 8a of the other vehicle 8, which is the preceding vehicle arranged in the traffic congestion line of the branch 30, and the entrance-side lane end 36a of the branch 30. Here, the entrance-side lane end 36a of the branch 30 is an end on entrance side of an area of the branch 30 surrounded by a pair of the boundaries 33 and 34 extending substantially parallel to each other. Further, in this embodiment, the "predetermined interval" is a distance in the lane direction of the branch 30 and a distance in which the own vehicle 9 can stop in a posture along the lane direction without inclining.

Even if the rearmost section exists in each of the approach spaces A1 to A4 of the branch 30, when the rearmost section is shorter than the predetermined interval, the approach space determination unit 16b determines that each of the approach spaces A1 to A4 doesn't include "the rearmost section of a predetermined interval or more" and meet the predetermined condition. In the examples shown in FIGS. 5 and 6, since the length of each of the rearmost sections L1, L2 is shorter than the total length of the own vehicle 9, each of the approach spaces A1, A2 doesn't include "the rearmost section of a predetermined interval or more". Therefore, it is determined that each of the approach spaces A1, A2 meets the predetermined condition.

Figure 3:
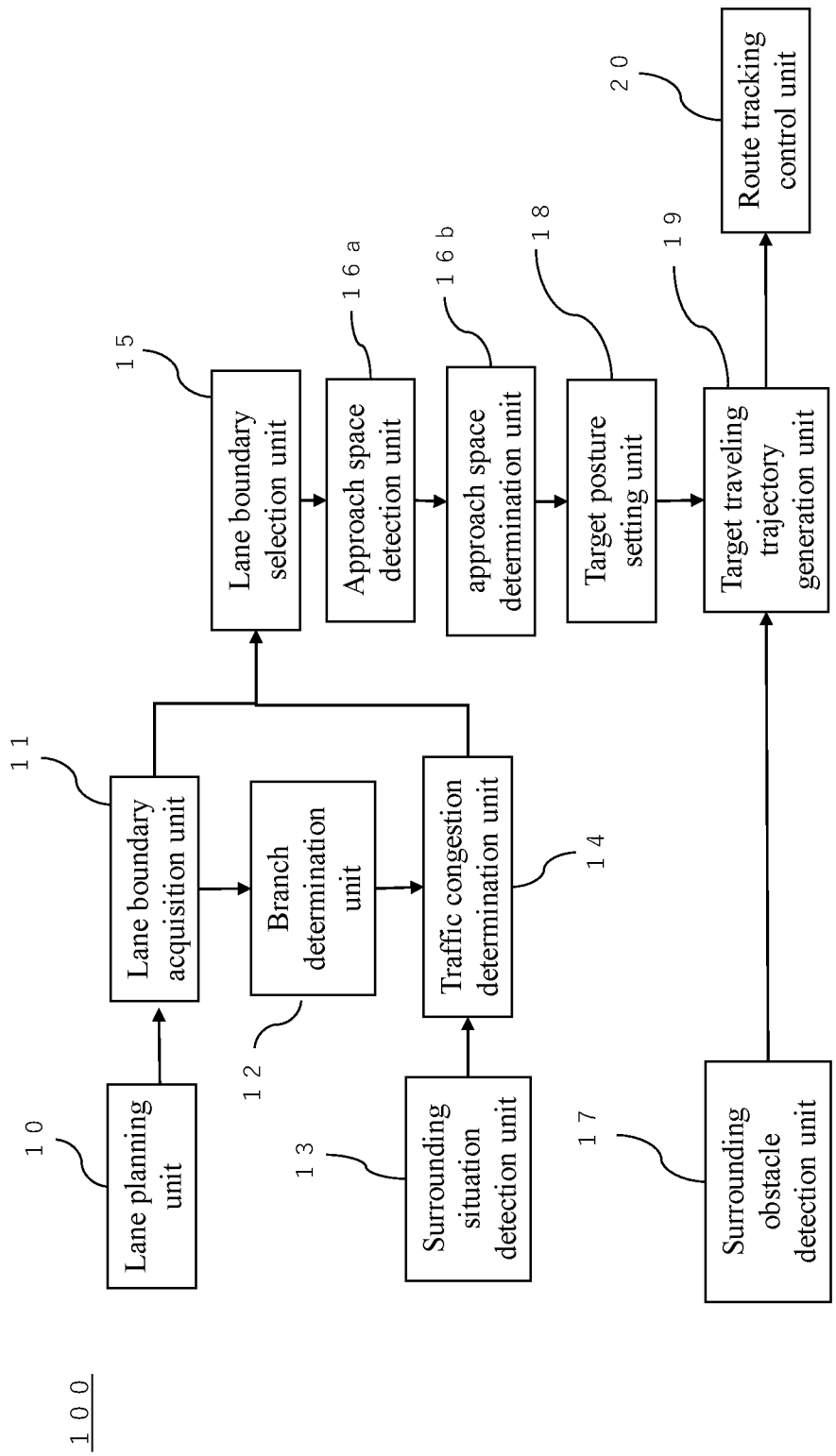
FIG. 3 is a block diagram showing a configuration of a travel control device shown in FIG. 1.

Furthermore, the target posture setting unit 18 shown in FIG. 3 sets the target posture of the own vehicle 9 at each of the target positions P1 to P4 at the rearmost end of the traffic congestion line based on the shape of each of the approach spaces A1 to A4. The target posture is set as a posture in which the direction of the vehicle body of the own vehicle 9 inclines at each of predetermined yaw angles $\theta y1$ to $\theta y4$ with respect to the lane direction of the branch 30.

Further, the surrounding obstacle detection unit 17 includes the camera 4 and the radar device 5 similarly to the surrounding situation detection unit 13 and detects obstacles around the own vehicle 9. Further, the target traveling trajectory generation unit 19 generates each of the target travel trajectories R1 to R4 based on the target posture and the target position of the own vehicle 9 and the information of the surrounding obstacles. Then, the route tracking control unit 20 controls the actuator 21 so that the own vehicle 9 travels following each of the target traveling trajectories R1 to R4.

Next, a method of setting the target posture of the own vehicle 9 by the target posture setting unit 18 will be described in more detail with reference to FIGS. 4 to 8.

Figure 4:
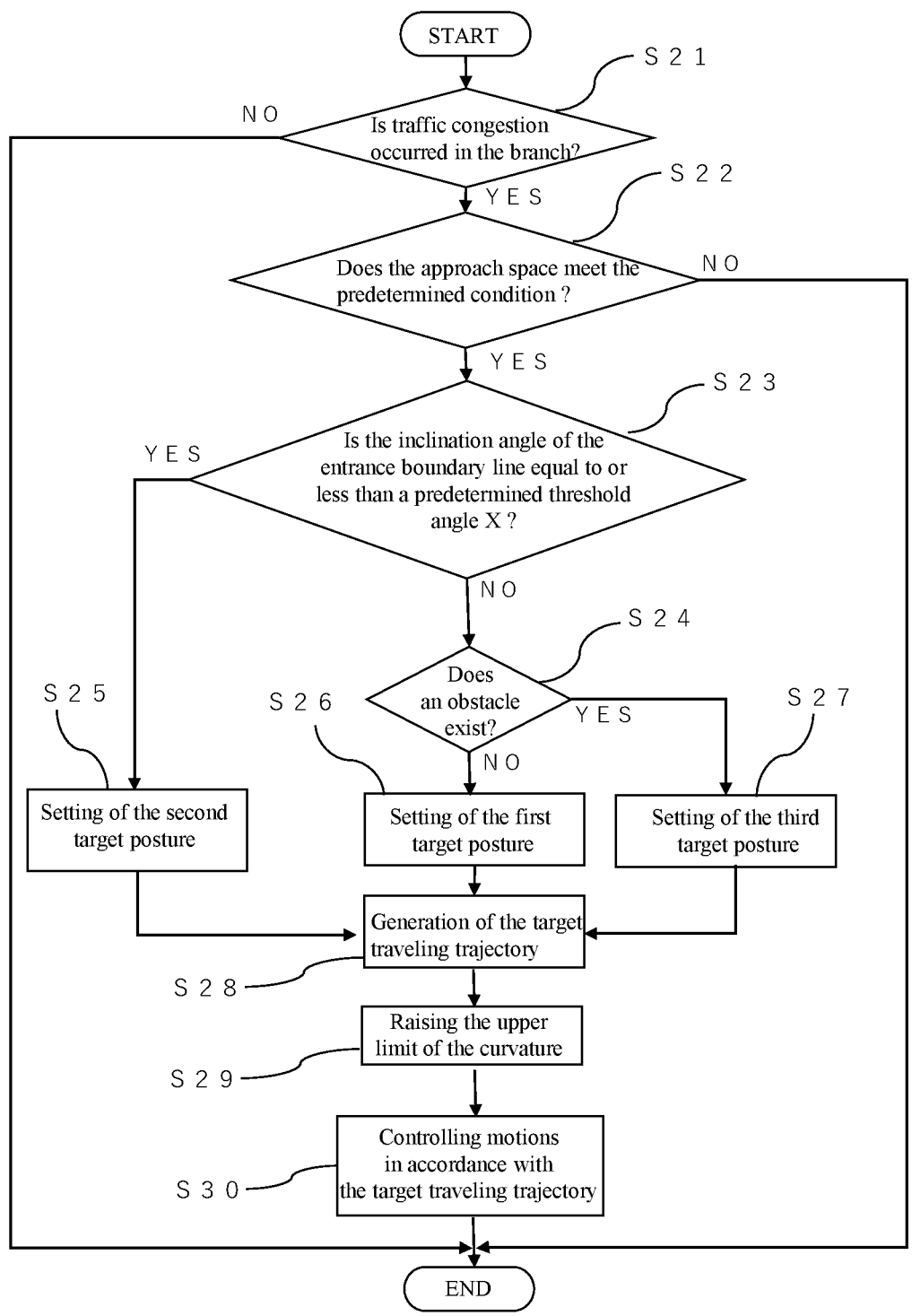
FIG. 4 is a flowchart showing a procedure of the travel control device setting the target posture of the own vehicle at the branch at the time of traffic congestion.

When the planned traveling route includes the branch 30 as shown in FIGS. 5 to 8, first, as shown in FIG. 4, in step S21, the traffic congestion determination unit 14 of the travel control device 100 determines whether or not traffic congestion is occurred in the branch 30. Here, when the branch 30 is not occurred, since the setting of the target posture of the own vehicle 9 is not necessary, the process ends.

Next, when traffic congestion is occurred in the branch 30, the process proceeds to step S22. In step S22, the approach space determination unit 16b determines whether or not each of the approach spaces A1 to A4 of the branch 30 shown in FIGS. 5 to 8 meet the predetermined condition. Specifically, the approach space determination unit 16b determines that "each of the approach spaces A1 to A4 meet the predetermined conditions" when each of the approach spaces A1 to A4 doesn't include the rearmost section at a predetermined interval or more between each of the entrance-side lane end 36a, 136a of the branch 30 and the rear end 8a of the other vehicle 8. Here, when the branch 30 includes a rearmost section of a predetermined interval or more, that is when the approach space does not meet the predetermined condition, the own vehicle 9 can be accommodated in the approach space without inclining the vehicle body in a state where the vehicle is decelerated to a predetermined vehicle speed or less. Incidentally, "a state where the own vehicle 9 is decelerated to a predetermined vehicle speed or less" also includes a state where the own vehicle 9 temporarily stops. Therefore, when the branch 30 doesn't include a rearmost section of a predetermined interval or more and the approach space does not match the predetermined condition, since the setting of the target posture of the own vehicle 9 is not necessary, the process ends. Specifically, when the approach space does not meet the predetermined condition, the travel control device 100 does not change the upper limit of the trajectory curvature of the own vehicle 9 and maintains the preset standard upper limit of specified trajectory curvature to control the motion of the own vehicle 9 so that the own vehicle 9 travels in a straight posture along the lane direction of the branch 30.

Next, when each of the entry spaces A1 to A4 of the branch 30 meets the predetermined condition, the process proceeds to step S23. In step S23, it is determined whether the inclination angle of the entrance boundary line of the branch 30 is equal to or less than a predetermined threshold angle X. Here, as shown in FIGS. 5 to 8, each of the entrance boundary lines 35,135 of the branch 30 is a boundary line that guides a vehicle that is about to enter the branch 30 from the traveling lane 40 to the branch 30 at a branch portion between the branch 30 and the traveling lane 40. The entrance boundary line 35 inclines with respect to the lane direction of the branch 30. The predetermined threshold angle X is, for example, 10°.

Figure 8:
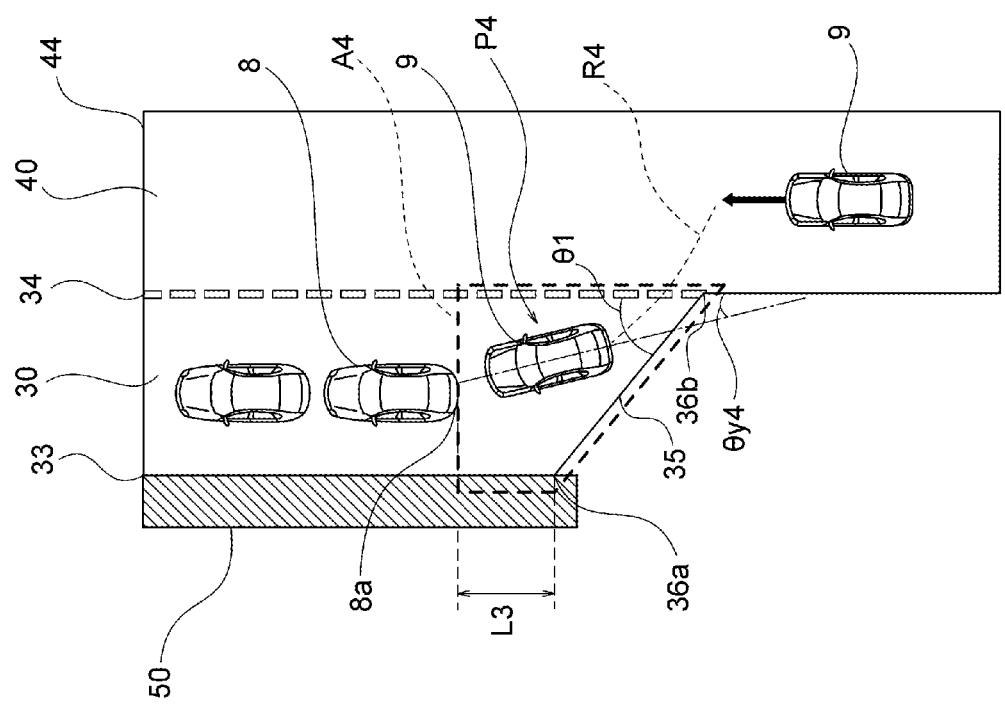
FIG. 8 is a diagram showing an example of the target posture of the own vehicle set by the travel control device shown in FIG. 1.

In step S23, when it is determined that the inclination angle of the entrance boundary line 35 of the branch 30 is larger than the threshold angle X, the process proceeds to step S24. In step S24, it is determined whether or not an obstacle 50 as shown in FIG. 8 exists on the opposite side of the traveling lane 40 along the branch 30. The obstacle 50 is, for example, a guard rail, planting, or the like provided along the branch 30. Incidentally, when the obstacle 50 exists on the side opposite to the traveling lane 40 along the branch 30, the obstacle 50 exists in front of the own vehicle 9 in the target position P4 at the rearmost end of the traffic congestion line.

Figure 5:
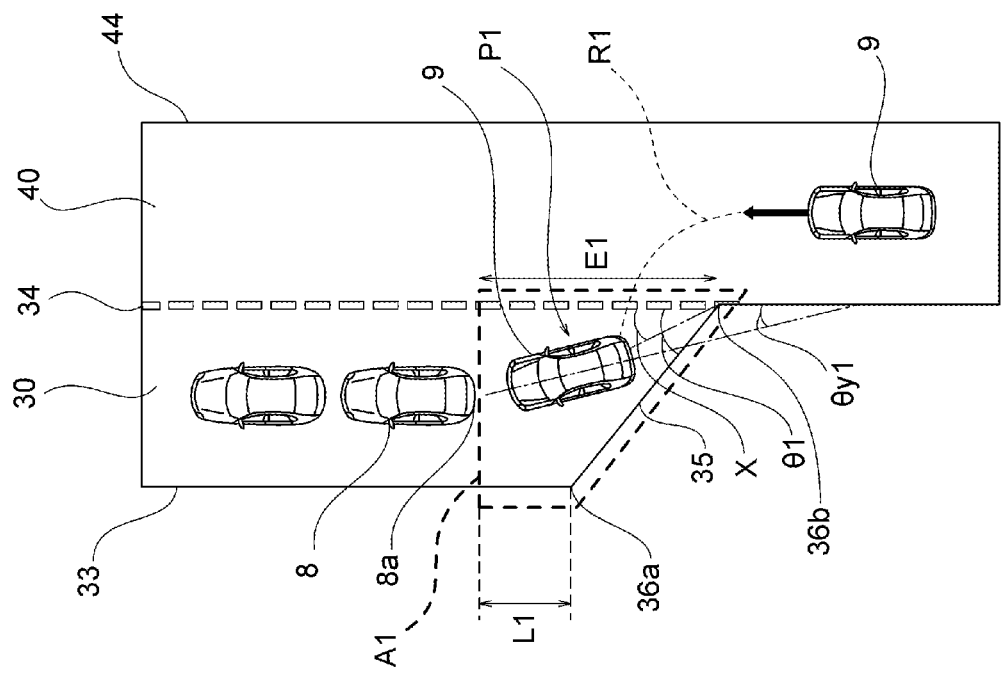
FIG. 5 is a diagram showing an example of the target posture of the own vehicle set by the travel control device shown in FIG. 1.
Figure 6:
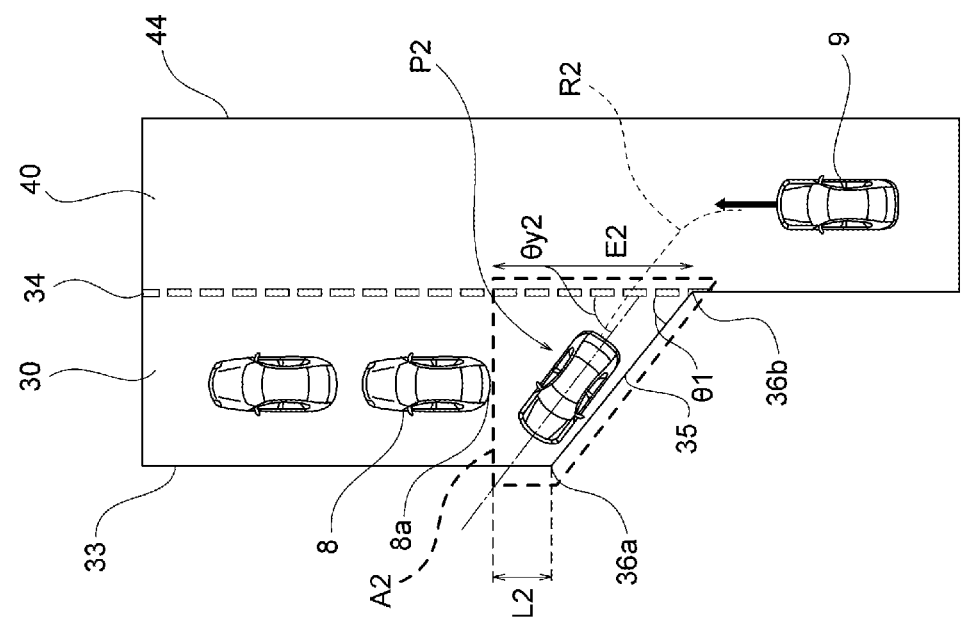
FIG. 6 is a diagram showing an example of the target posture of the own vehicle set by the travel control device shown in FIG. 1.
Figure 7:
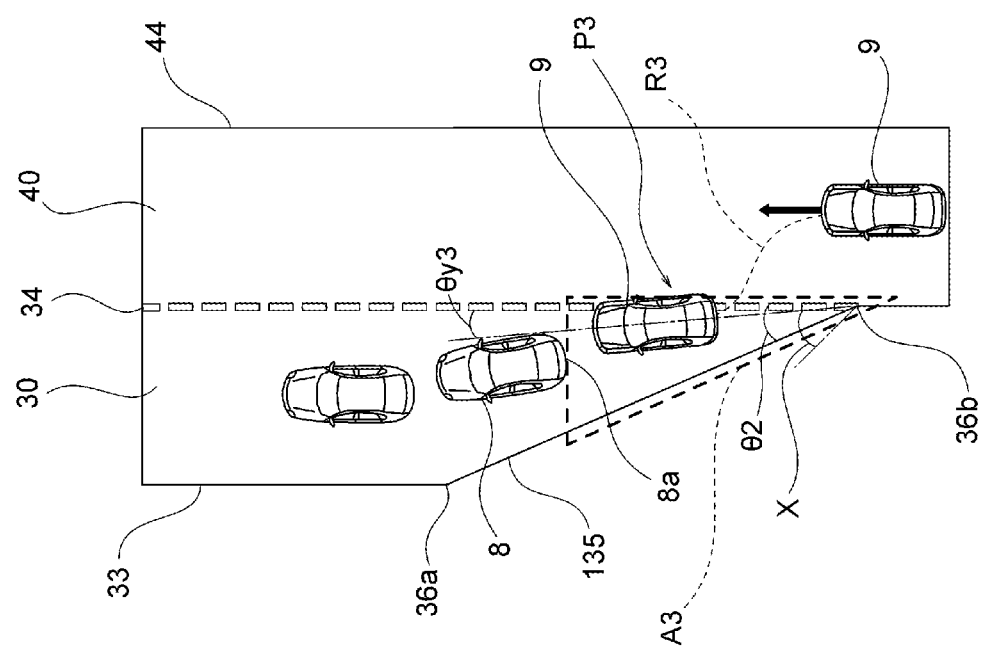
FIG. 7 is a diagram showing an example of the target posture of the own vehicle set by the travel control device shown in FIG. 1.

In step S24, when it is determined that no obstacle exists, the process proceeds to step S26. In step S26, the target posture setting unit 18 sets the first target posture as shown in the examples of FIGS. 5 and 6, as the target posture of the own vehicle 9 at each of the target positions P1, P2. Further, in step S23, when it is determined that the inclination angle of the entrance boundary line 35 is equal to or less than the threshold angle X, the process proceeds to step S25. In step S25, the target posture setting unit 18 sets the second target posture as shown in the example of FIG. 7, as the target posture of the own vehicle 9 at the target position P3. Further, when it is determined in step S24 that the obstacle 50 exists along the branch 30, the process proceeds to step S27. In step S27, the target posture setting unit 18 sets the third target posture as shown in the example of FIG. 8, as the target posture of the own vehicle 9 at the target position P4. The first target posture, the second target posture, and the third target posture are target postures set based on different setting methods.

Next, in Step S28, based on the target posture set in each of Steps S25 to S27, the target traveling trajectory generation unit 19 generates each of the target traveling trajectories R1 to R4. Then, in step S29, the route tracking control unit 20 raises the upper limit of the trajectory curvature of the own vehicle 9 and, in step S30, controls the motion of the own vehicle 9 in accordance with each of the target traveling trajectories R1 to R4.

Incidentally, the upper limit of the trajectory curvature is an upper limit value set to limit the trajectory curvature of turning travel of the own vehicle 9. By raising the upper limit of the trajectory curvature, the own vehicle 9 travels along each of the target traveling trajectories R1 to R4 different from the normal traveling trajectory to take the target postures according to various yaw angles at the target positions P1 to P4.

Here, each of the target traveling trajectories R1 to R4 may be generated according to the target posture set based on the shape of each of the approach spaces A1 to A4. Further, a trajectory capable of realizing the optimum target posture may be selected may be selected as each of the target traveling trajectories R1 to R4 from among the simulated traveling trajectories according to the plurality of trajectory curvatures. Incidentally, the "optimum target posture" refers, for example, to a posture such that when the own vehicle 9 is in each of the approach spaces A1 to A4, vehicle body does not protrude into the traveling lane 40 or the amount protruding into the traveling lane 40 is equal to or less than a predetermined amount.

A method for setting the first target posture, the second target posture, and the third target posture of the own vehicle 9 will be described in more detail with reference to FIGS. 5 to 8, respectively.

First, in the example shown in FIG. 5, the rearmost section L1 is shorter than a predetermined interval, the approach space A1 meets a predetermined condition, the inclination angle θ1 of the entrance boundary line 35 of the branch 30 is larger than the predetermined threshold angle X, and no obstacle exists along the branch 30. Further, the first target posture of the own vehicle 9 at the target position P1 behind the other vehicle 8 is a posture inclined at the yaw angle θy1 of the vehicle body with respect to the lane direction of the branch 30. Further, the target traveling trajectory generation unit 19 of the travel control device 100 generates a target traveling trajectory R1 from the current position of the own vehicle 9 to the target position P1. The route tracking control unit 20 raises the upper limit of trajectory curvature of the own vehicle 9, to control the motion of the own vehicle 9 so that the own vehicle 9 follows the target traveling trajectory R1 and take the first target posture at the target position P1.

Incidentally, the target position P1 of the own vehicle 9 is set in the approach space A1.

On the other hand, in the example shown in FIG. 6, similarly to FIG. 5, the rearmost section L2 is shorter than a predetermined interval, the approach space A2 meets a predetermined condition, the inclination angle θ1 of the entrance boundary line 35 is larger than the predetermined threshold angle X, and no obstacle exists along the branch 30. Further, the rearmost section L2 of the approach space A2 shown in FIG. 6, since the interval is smaller than the rearmost section L1 of the approach space A1 shown in FIG. 5, it is determined that the approach space A2 is smaller than the approach space A1. As shown in FIG. 5, as the approach space A1 between the other vehicle 8 and the entrance boundary line 35 is larger, the yaw angle θy1 of the first target posture of the own vehicle 9 at the target position P1 approaches 0 degrees. On the other hand, as shown in FIG. 6, as the approach space A2 is smaller, the yaw angle θy2 of the first target posture of the own vehicle 9 at the target position P2 get larger to approximate the inclination angle θ1 of the entrance boundary line 35. Furthermore, when the approach space A2 is smaller than a predetermined space, the yaw angle θy2 of the first target posture of the own vehicle 9 at the target position P2 becomes the same angle as the inclination angle θ1 of the entrance boundary line 35 so that the first target posture of the own vehicle 9 inclines along the entrance boundary line 35. That is, when the first target posture of the own vehicle 9 is set, the yaw angle of the first target posture of the own vehicle 9 changes according to a size of each of the approach spaces A1, A2 of the branch 30.

In the example shown in FIG. 6, the target traveling trajectory generation unit 19 of the travel control device 100 generates a target traveling trajectory R2 from the current position of the own vehicle 9 to the target position P2. The route tracking control unit 20 raises the upper limit of trajectory curvature of the own vehicle 9 to control the motion of the own vehicle 9 so that the own vehicle 9 follows the target traveling trajectory R2 and takes the first target posture at the target position P2.

Incidentally, the determination standard of the size of each of the approach spaces A1, A2 may be not only the length of the rearmost section L1, L2 but also the area or the width of each of the approach spaces A1, A2. Incidentally, the width of each of the approach spaces A1, A2 is the length of each of the approach spaces A1, A2 in the direction perpendicular to the lane direction of the branch 30, i.e. in the width direction of the branch 30. Further, as shown in FIGS. 5 and 6, the travel control device 100 may determine the size of each of the approach spaces A1, A2 based on each of the entrance lengths E1, E2 of the approach spaces A1, A2. Each of the entrance lengths E1, E2 of each of the approach spaces A1, A2 is a length in the lane direction between the rear end 8a of the other vehicle 8 and the branch point 36b of the branch 30. That is, the first target posture is set based on the shape of each of the approach spaces A1, A2.

Here, the shape of each of the approach spaces A1, A2 which is a standard for setting the first target posture includes the area and the width of each of the approach spaces A1, A2, the interval of each of the rearmost section L1, L2, each of the entrance lengths E1, E2, the aspect ratio of each of the rearmost sections L1, L2 and the inclination angle θ1 of the entrance boundary line 35. Further, when the entrance boundary line 35 is a curved shape, the inclination of the straight line connecting the start point and the end point of the entrance boundary line 35 is also included in the shape of each of the approach spaces A1, A2.

Next, an example of the second target posture of the own vehicle 9 is shown in FIG. 7.

In the example shown in FIG. 7, since the rear end 8a of the other vehicle 8 is at a position rearward the entrance-side lane end 36a, no rearmost section exists in the approach space A3 between the rear end 8a of the other vehicle 8 and the entrance boundary line 135. Further, the inclination angle θ2 of the entrance boundary line 135 of the branch 30 is smaller than the predetermined threshold angle X. Further, the target posture of the own vehicle 9 at the time of temporarily stopping at the target position P3 behind the other vehicle 8 of the traffic congestion line, the direction of the vehicle body is inclined at a yaw angle θy3 with respect to the lane direction of the branch 30. Here, the yaw angle θy3 of the target posture of the own vehicle 9 is set to be smaller than the inclination angle θ2 of the entrance boundary line 135.

As shown in FIG. 7, the target traveling trajectory generation unit 19 of the travel control device 100 generates a target traveling trajectory R3 from the current position of the own vehicle 9 to the target position P3. The route tracking control unit 20 controls the motion of the own vehicle 9 so that the own vehicle 9 follows the target traveling trajectory R3 and take the target posture at the target position P3.

Next, an example of the third target posture of the own vehicle 9 is shown in FIG. 8.

In the example shown in FIG. 8, the rearmost section L3 is shorter than a predetermined interval, the inclination angle θ1 of the entrance boundary line 35 of the branch 30 is larger than the predetermined threshold angle X, the obstacle 50 exists along the left boundary 33 of the branch. It is assumed that the obstacle 50 is a guard rail. Since the rearmost section L3 is shorter than a predetermined interval, the approach space A4 meets the predetermined condition. Further, the target posture of the own vehicle 9 at the time of temporarily stopping at the target position P4 behind the other vehicle 8 of the traffic congestion line is a posture that the vehicle body inclines at a yaw angle θy4 with respect to the lane direction of the branch 30. In the case where the approach space has the same shape, the yaw angle θy4 of the third target posture is set to be smaller than the yaw angle in the case where the obstacle 50, as shown in FIGS. 5 and 6, doesn't exist. Further, the yaw angle θy4 of the third target posture is set to be smaller as the height of the obstacle 50 is higher.

As shown in FIG. 8, the target traveling trajectory generation unit 19 of the travel control device 100 generates a target traveling trajectory R4 from the current position of the own vehicle 9 to the target position P4. The route tracking control unit 20 controls the motion of the own vehicle 9 so that the own vehicle 9 follows the target traveling trajectory R4 and take the target posture at the target position P4.

As described above, the travel control device 100 according to this embodiment sets the target posture of the own vehicle 9 at each of the target positions P1 to P4 behind the other vehicle 8 when determining that traffic congestion is occurred in the branch 30 adjacent to the traveling lane 40 and each of the approach spaces A1 to A4 of the branch 30 meet the predetermined condition. Thus, the travel control device 100 can control the motion of the own vehicle 9 in accordance with the situation of various traffic congestion that may occur in the branch 30.

Further, the travel control device 100, when determining that traffic congestion isn't occurred in the branch 30, determines whether or not each of the approach spaces A1 to A4 includes the rearmost section equal to or greater than a predetermined interval that the own vehicle 9 can be accommodated without inclining the vehicle body in a state where the own vehicle 9 is decelerated to a predetermined vehicle speed or less. Then, the travel control device 100, when determining that each of the approach spaces A1 to A4 doesn't include the rearmost section equal to or greater than a predetermined interval, determines that each of the approach spaces A1 to A4 meets the predetermined condition. Thus, the travel control device 100 can set the optimum target posture of the own vehicle 9 at each of the target positions P1 to P4 even when there is no sufficient rearmost section in the approach spaces A1 to A4, Further, as shown in FIG. 6, the travel control device 100, when the approach space A2 meets the predetermined condition, sets the target posture of the own vehicle 9 so that as the approach space A2 is smaller, the yaw angle θy2 of the own vehicle 9 to approach the inclination angle θ1 of the entrance boundary line 35. Thus, as shown in FIG. 6, even when the rearmost section L2 of the branch 30 is shorter than a predetermined interval, the own vehicle 9 can take a target posture inclining the vehicle body largely and aligned at the rearmost end of the traffic congestion line of the branch 30 without protruding to the traveling lane 40.

Furthermore, as shown in FIG. 5, the travel control device 100, when the approach space A1 meets the predetermined condition, sets the target posture of the own vehicle 9 so that as the approach space A1 is larger, the yaw angle θy1 approaches to 0 degrees. Thus, it is possible that the target posture of the own vehicle 9 is set more appropriately in accordance with the position of the other vehicle 8. Further, when the other vehicle 8 is advanced, the own vehicle 9 also follows the other vehicle 8 more smoothly along the branch 30 since the yaw angle of the target posture of the own vehicle 9 approaches 0 degrees as the approach space is larger, i.e., as the position of the other vehicle 8 is more forward.

Further, as shown in FIG. 7, when the approach space A3 meets the predetermined condition and the incline angle θ2 of the entrance boundary line 135 of the branch 30 is less than the threshold angle X, the travel control device 100 sets the target posture of the own vehicle 9 so that the yaw angle θy3 of the own vehicle 9 in the approach space A3 is smaller than the inclination angle θ2 of the entrance boundary line 135. Here, when the inclination angle θ2 of the entrance boundary line 135 of the branch 30 is the threshold angle X or less, if the width of the approach space A3 in the target position P3 of the own vehicle 9 is narrow and the inclination of the vehicle body of the own vehicle 9 increases, the vehicle body possibly protrudes into the traveling lane 40. Therefore, the travel control device 100 sets the target posture of the own vehicle 9 so that the yaw angle θy3 of the own vehicle 9 is smaller than the inclination angle θ2 of the entrance boundary line 135. Thus, the travel control device 100 prevents the vehicle body of the own vehicle 9 from stopping behind the other vehicle 8 in an excessively inclined posture and make a protruding portion of the own vehicle 9 protruding to the traveling lane 40 minimum.

Furthermore, as shown in FIG. 7, when the approach space A3 meets the predetermined condition and when the inclination angle θ2 of the entrance boundary line 135 is equal to or less than the threshold angle X, the travel control device 100 makes the yaw angle θy3 of the own vehicle 9 closer to 0 degrees, as the approach space A3 is larger. Thus, the travel control device 100 can minimize the protruding portion of the vehicle body of the own vehicle 9 that may protrude into the traveling lane 40 and set the target posture of the own vehicle 9 in accordance with the position of the other vehicle 8.

Further, as shown in FIG. 8, when the approach space A4 meets the predetermined condition and the obstacle 50 exists on the boundary 33 of the left side of the branch 30, the travel control device 100 sets the target posture of the own vehicle 9 so that the yaw angle θy4 of the own vehicle 9 is smaller than when it is determined that no obstacle exists. Here, when there is an obstacle such as the obstacle 50 in front of the own vehicle 9, the own vehicle 9 faces the obstacle and so the occupant of the own vehicle 9 may feel uneasy about the possibility of compression feeling or collision, if the inclination of the vehicle body of the own vehicle 9 is increased as shown in the example of FIG. 6. Therefore, the travel control device 100 can suppress the excessively inclined posture, while setting the target posture so that the own vehicle 9 inclines at the target position P4. Therefore, the sense of pressure and the sense of anxiety felt by the occupant of the own vehicle 9 with respect to the obstacle 50 are reduced.

Further, the travel control device 100 sets the target posture so that the yaw angle θy4 of the own vehicle 9 is smaller as the height of the obstacle 50 is higher. Here, in general, the occupant of the own vehicle 9 tends to feel the sense of compression with respect to the obstacle 50 as the height of the obstacle 50 in the front of the own vehicle 9 is higher. Therefore, it is possible to reduce the feeling of pressure felt by the occupant of the own vehicle 9 by reducing the yaw angle θy4 of the target posture of the own vehicle 9 as the height of the obstacle 50 is higher.

Further, when each of the approach spaces A1 to A4 meet the predetermined conditions, the travel control device 100 sets the upper limit of the trajectory curvature of the own vehicle 9 higher than the preset upper limit of the specified trajectory curvature to generate each of the target traveling trajectories R1 to R4 from the current position of the own vehicle 9 to each of the target travel positions P1 to P4. Thus, the own vehicle 9 can travel along each of the target traveling trajectories R1 to R4, which are different from the normal traveling trajectory, and take the target posture according to the various yaw angles at each of the target positions P1 to P4.

Incidentally, the travel control device 100 may determine that each of the approach spaces A1 to A4 meets the predetermined condition when determining based on various standards that the own vehicle 9 decelerating to a predetermined vehicle speed or less cannot be accommodated in each of the approach spaces A1 to A4 without inclining the vehicle body. Here, not only when each of the rearmost sections L1 to L3 is shorter than a predetermined interval, but also when the area of each of the approach spaces A1 to A4 is equal to or less than a predetermined area or the width of each of the approach spaces A1 to A4 is equal to or less than a predetermined length, it is determined that "the own vehicle 9 cannot be accommodated in each of the approach spaces A1 to A4 without inclining the vehicle body". Thus, the travel control device 100 can set various target postures of the own vehicle 9 corresponding to the case where there is no sufficient space in each of the approach spaces A1 to A4.

Further, the travel control device 100 may determine whether or not the vehicle body of the own vehicle 9 is predicted to protrude by a predetermined amount or more in the traveling lane 40 when the own vehicle 9 travels on the basis of the upper limit of the specified trajectory curvature and enters each of the approach spaces A1 to A4 while decelerating to a predetermined vehicle speed or less. Then, the travel control device 100 determines that each of the approach spaces A1 to A4 meets the predetermined condition when it is predicted that the vehicle body of the vehicle protrudes into the traveling lane 40 by a predetermined amount or more. Thus, the travel control device 100 can set the target posture of the own vehicle 9 in advance so that the vehicle body of the own vehicle 9 does not protrude into the traveling lane 40 by a predetermined amount or more.

Incidentally, the travel control device 100 may determine whether or not the vehicle body of the own vehicle 9 is predicted to protrude into the traveling lane 40 when the own vehicle 9 travels on the basis of the upper limit of the specified trajectory curvature and enters each of the approach spaces A1 to A4 in a state where the vehicle decelerates to a predetermined vehicle speed or less. That is, in this case, the travel control device 100 determines "a predetermined amount" as 0, and determines whether or not a protruding amount indicating an amount by which the own vehicle 9 protrudes into the traveling lane 40 is equal to or greater than a predetermined amount=0. Thus, the travel control device 100 can set the target posture of the own vehicle 9 to prevent the vehicle body of the own vehicle 9 from protruding to the traveling lane 40 more reliably.

Second Embodiment

The travel control device 200 for the vehicle according to the second embodiment and the travel control method for a vehicle by the travel control device 200 will be described with reference to FIGS. 9 to 12. Note that the same reference numerals as those in FIGS. 1 to 8 indicate the same or similar configurations, and thus detailed description thereof is omitted.

Figure 9:
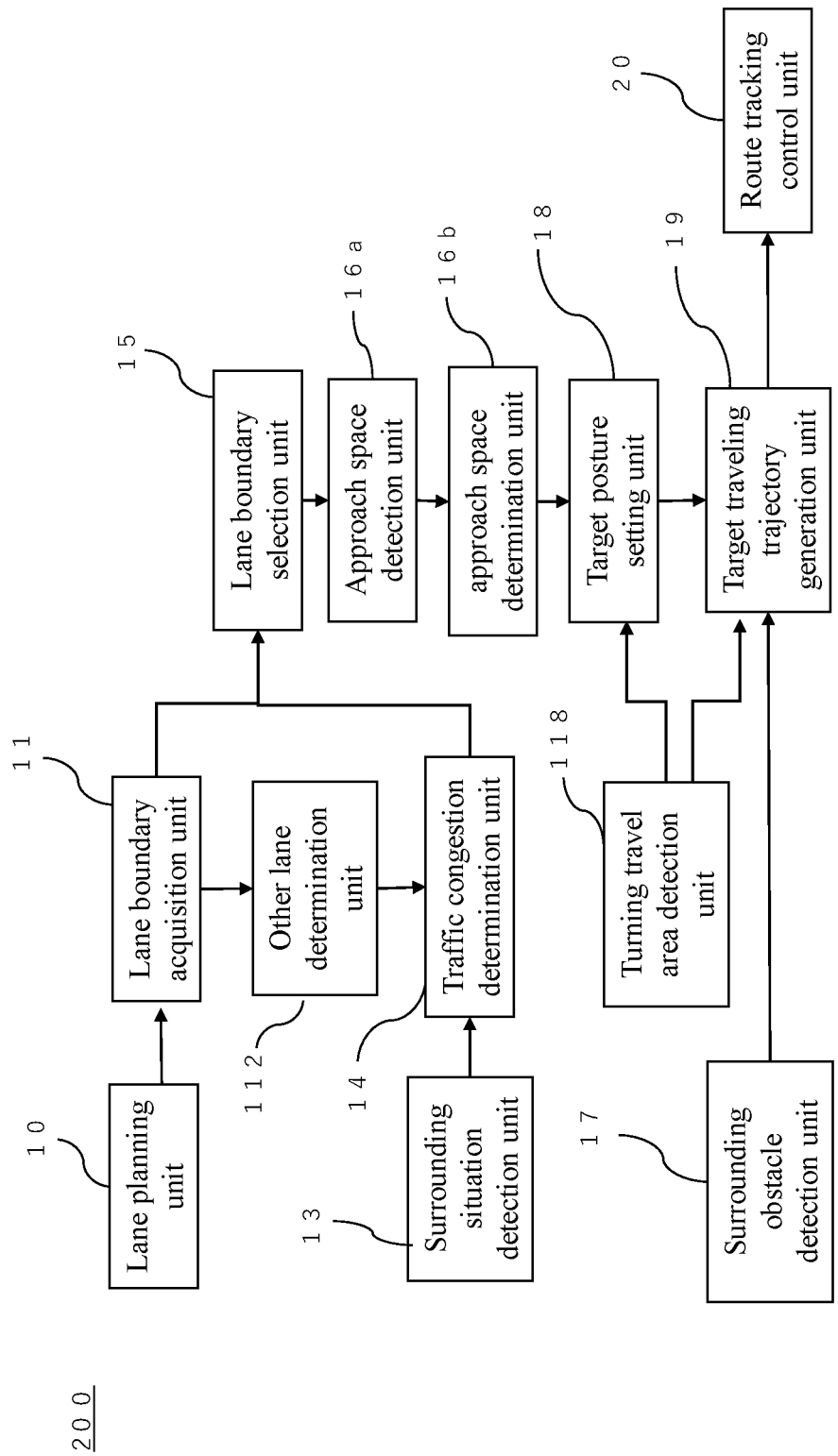
FIG. 9 is a block diagram showing a configuration of a travel control device according to a second embodiment of the present invention.

As shown in FIG. 9, the travel control device 200 includes the other lane determination unit 112 instead of the branch determination unit 12 of the travel control device 100 according to the first embodiment. The other lane determination unit 112 determines whether or not there is a right turn lane 130a extending in a direction intersecting with the traveling lane 140 in the planned traveling route calculated in advance (see FIGS. 10 to 12). Further, the travel control device 200 has a turning travel area detection unit 118. The turning travel area detection unit 118 includes the camera 4 or the radar device 5.

Figure 10:
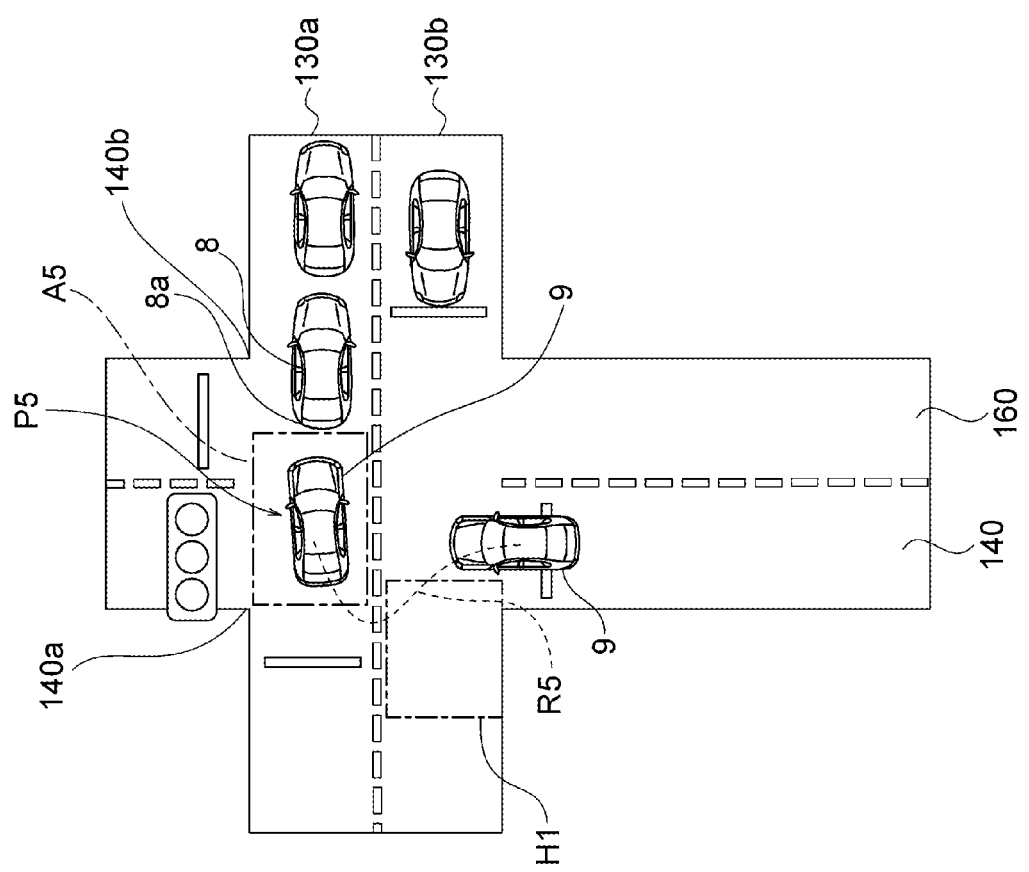
FIG. 10 is a diagram showing an example of the target posture of the own vehicle set by the travel control device shown in FIG. 9.
Figure 11:
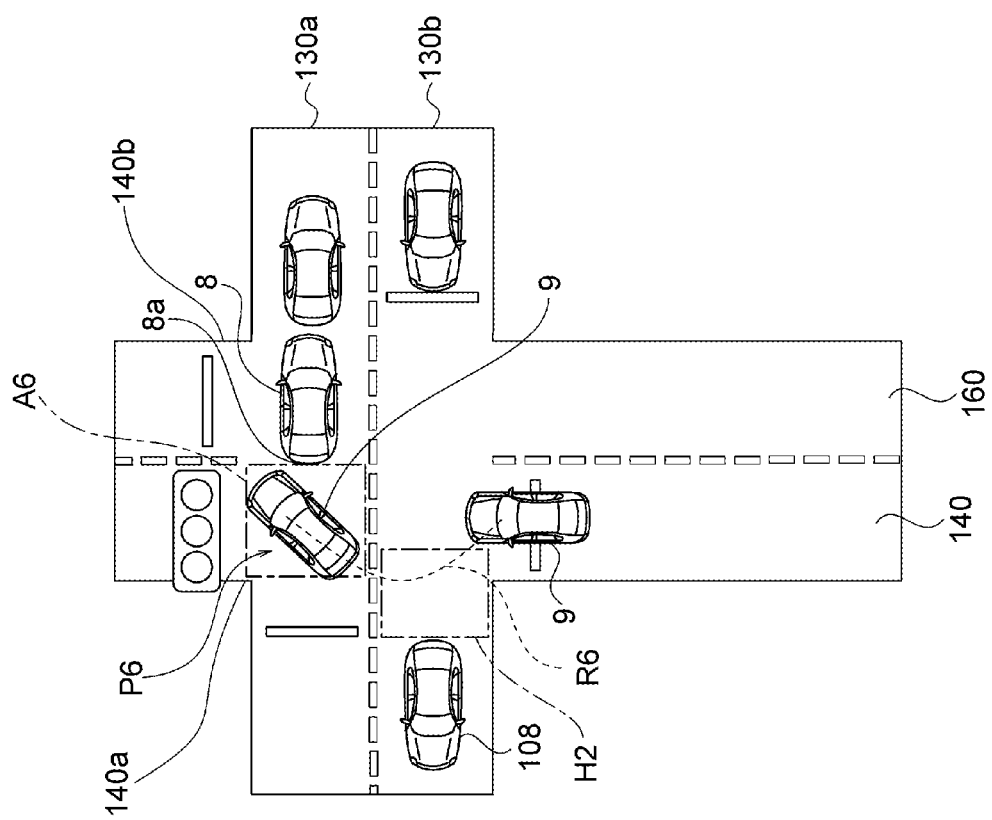
FIG. 11 is a diagram showing an example of the target posture of the own vehicle set by the travel control device shown in FIG. 9.
Figure 12:
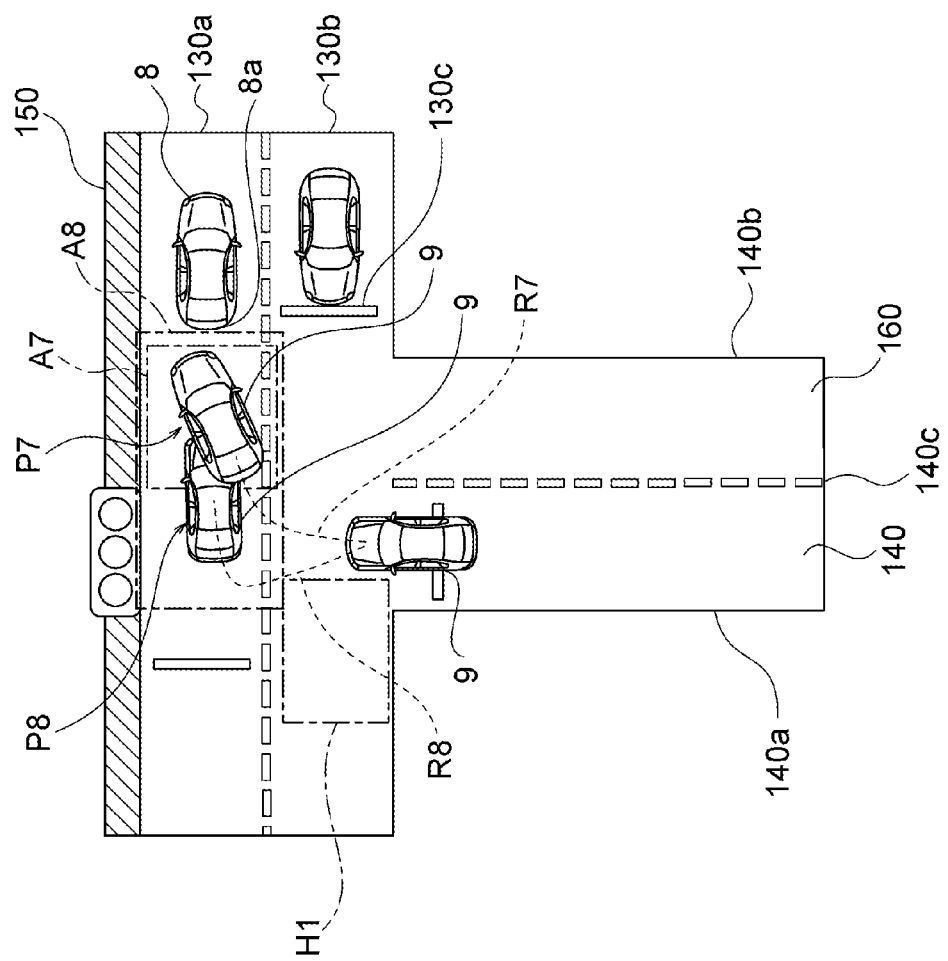
FIG. 12 is a diagram showing an example of the target posture of the own vehicle set by the travel control device shown in FIG. 9.

An example of a method for setting a target posture and a target traveling trajectory of the own vehicle 9 by the travel control device 200 is shown in FIGS. 10 to 12.

First, FIG. 10 shows an example in which the own vehicle 9 turns right at the intersection. The own vehicle 9 changes lanes from the current traveling lane 140 to the right turn lane 130a, which is the other lane, across the left turn lane 130b. The right turn lane 130a and the left turn lane 130b are lanes extending in a direction crossing the traveling lane 140. The right turn lane 130a includes a traffic congestion line, and the own vehicle 9 moves to the target position P5 behind the other vehicle 8 at the rearmost end of the traffic congestion line.

Here, the approach space detection unit 16a of the travel control device 200 detects the approach space A5 of the right turn lane 130a. The approach space A5 is set as an area between the position of the left boundary line 140a of the traveling lane 140 and the rear end 8a of the other vehicle 8. That is, the shape of the approach space A5 varies depending on the position of the rear end 8a of the other vehicle 8. In the example shown in FIG. 10, the approach space A5 has a length equal to or longer than a predetermined length in the lane direction of the right turn lane 130a, and the own vehicle 9 can be arranged in the approach space A5 of the target position P5 in a straight posture along the lane direction of the right turn lane 130a.

An approach space determination unit 16b determines whether or not the approach space A5 meets a predetermined condition set in advance. The predetermined condition in the example shown in FIG. 10 is that the rear end 8a of the other vehicle 8, defining one end of the approach space A5, is positioned behind a predetermined position. Incidentally, the predetermined position in this case is, for example, a position of the right boundary line 140b of the adjacent oncoming lane 160 of the traveling lane 140.

Here, the turning travel area H1 is an area of the left turn lane 130b necessary for the own vehicle 9 to swing the head and turning. The turning travel area detection unit 118 detects the turning travel area H1 necessary for the own vehicle 9 to swing the head and to turning between the current position of the own vehicle 9 and the target position P5. In the example shown in FIG. 10, since there is no another vehicle or obstacle in the turning travel area H1, the turning traveling area H1 has a shape with sufficient space for the own vehicle 9 to turn with swinging the head.

Based on the shape of the approach space A5 and the shape of the turning travel area H1, the target posture setting unit 18 sets the yaw angle of the target posture of the own vehicle 9 to 0 degrees. Then, the target traveling trajectory generation unit 19 generates a target traveling trajectory R5 from the current position of the own vehicle 9 to the target position P5 so that the own vehicle 9 takes a target posture along the lane of the right turn lane 130a at the target position P5.

Then, the route tracking control unit 20 raises the upper limit of trajectory curvature of the own vehicle 9, and controls the motion of the own vehicle 9 so that the own vehicle 9 travels following the target traveling trajectory R5. The own vehicle 9 traveling along the target traveling trajectory R5 can enter the approach space A5 of the right turn lane 130a while swinging its head to make a sharp turn using the turning travel area H1.

Next, FIG. 11 also shows an example in which the own vehicle 9 turns right at the intersection, similarly to FIG. 10. The own vehicle 9 moves to the target position P6 behind the other vehicle 8 at the rearmost end of the traffic congestion line of the right turn lane 130a.

The approach space detection unit 16a of the travel control device 200 detects the approach space A6 of the right turn lane 130a. Here, since the rear end 8a of the other vehicle 8 is at a predetermined position, that is a position behind the right side border line 140b of the adjacent opposing lane 160, the approach space determination unit 16b determines that the approach space A6 meets the predetermined condition. Further, in the example shown in FIG. 11, the own vehicle 9 cannot be accommodated in the approach space A6 without inclining the vehicle body.

Here, in the example shown in FIG. 11, in the left turn lane 130b, another vehicle 108 stops on the left side of the own vehicle 9. Therefore, the turning travel area H2 is narrower than the turning travel area H1 shown in FIG. 10.

Based on the shape of the approach space A6 and the shape of the turning travel area H2, the target posture setting unit 18 sets the target posture of the own vehicle 9 as an posture inclining with respect to the lane direction of the right turn lane 130a. The yaw angle of the target posture of the own vehicle 9 is set as an angle equal to or less than the maximum angle that can be accommodated in the approach space A6. The target traveling trajectory generation unit 19 generates a target traveling trajectory R6 from the current position of the own vehicle 9 to the target position P6 so that the own vehicle 9 takes a target posture inclining with respect to the lane direction of the right turn lane 130a at the target position P6.

Then, the route tracking control unit 20 raises the upper limit of trajectory curvature of the own vehicle 9, and controls the motion of the own vehicle 9 so that the own vehicle 9 travels following the target traveling trajectory R6. The own vehicle 9 traveling along the target traveling trajectory R6 can enter the approach space A6 of the right turn lane 130a while swinging its head and turning using the turning travel area H2. Incidentally, the own vehicle 9 traveling along the target traveling trajectory R6, as compared with the own vehicle 9 traveling along the target traveling trajectory R5 shown in FIG. 10, turns gently.

Next, FIG. 12 shows an example in which the own vehicle 9 turns right on the T-shaped road. The own vehicle 9 moves to the target position P7 or P8 behind the other vehicle 8 at the rearmost end of the traffic congestion line of the right turn lane 130a. The curb stone 150 is provided on the sidewalk side of the right turn lane 130a, and the surrounding obstacle detection unit 17 detects the curb stone 150 as an obstacle.

The approach space detection unit 16a of the travel control device 200 detects the approach space A7 or the approach space A8 of the right turn lane 130a. Here, the approach space A7 and the approach space A8 have different shapes based on the difference in the setting of the detection standard of the approach space by the approach space detection unit 16a. Specifically, the approach space A7 is set as an area between the position of the boundary line 140c and the rear end 8a of the other vehicle 8, the boundary line 140c being between the traveling lane 140 and the adjacent oncoming lane 160. On the other hand, the approach space A8 is set as an area between the position of the left boundary line 140a of the traveling lane 140 and the rear end 8a of the other vehicle 8. That is, the shape of the approach space differs depending on the difference in the detection standard of the approach space.

Next, since the rear end 8a of the other vehicle 8 is located behind a predetermined position, for example, the position of the stopping line 130c of the left turn lane 130b, the approach space determination unit 16b determines that the approach space A7 or the approach space A8 meets the predetermined condition. The own vehicle 9 cannot be accommodated in the approach space A7 without inclining the vehicle body, but can be accommodated in a straight posture along the lane direction of the right turn lane 130a in the approach space A8.

Furthermore, the turning travel area detection unit 118 detects the turning traveling area H1 necessary for the own vehicle 9 to swing the head and to turn between the current position of the own vehicle 9 and the target position P7 or P8.

When the approach space detection unit 16 detects the approach space A7, the target posture setting unit 18 sets the target posture of the own vehicle 9 at the target position P7 as a posture inclining with respect to the lane direction of the right turn lane 130a based on the shape of the approach space A7. Here, the yaw angle of the target posture of the own vehicle 9 at the target position P7 is set to be smaller than the yaw angle of the target posture when the curb stone 150 doesn't exist so that the angle with respect to the curb stone 150 is as small as possible. Then, the target traveling trajectory generation unit 19 generates the target traveling trajectory R7 from the current position of the own vehicle 9 to the target position P7.

The route tracking control unit 20 raises the upper limit of trajectory curvature of the own vehicle 9 and controls the motion of the own vehicle 9 so that the own vehicle 9 travels following the target traveling trajectory R7. Incidentally, when the own vehicle 9 travels along the target traveling trajectory R7, it is not necessary to raise the upper limit of trajectory curvature of the own vehicle 9 since the own vehicle doesn't swing the head to turn sharply.

On the other hand, when the approach space detection unit 16a detects the approach space A8, based on the shape of the approach space A8, the target posture setting unit 18 sets the target posture of the own vehicle 9 at the target position P8 as a posture straight along the lane of the right turn lane 130a. Here, the yaw angle of the target posture of the own vehicle 9 at the target position P8 is set to 0 degrees. Then, the target traveling trajectory generation unit 19 generates a target traveling trajectory R8 from the current position of the own vehicle 9 to the target position P8.

The route tracking control unit 20 raises the upper limit of trajectory curvature of the own vehicle 9 and controls the motion of the own vehicle 9 so that the own vehicle 9 travels following the target traveling trajectory R8. Therefore, the own vehicle 9 can enter the approach space A8 of the right turn lane 130a while swinging the head and turning using the turning travel area H1.

As described above, the travel control device 200 according to this embodiment sets the target posture of the own vehicle 9 at the target positions P5 to P8 behind the other vehicle 8 when determining that traffic congestion is occurred in the right turn lane 130a on the planned traveling route and when each of the approach spaces A5 to A8 of the right turn lane 130a meets the predetermined condition. Thus, similarly to the travel control device 100 according to the first embodiment, the travel control device 200 can control the motion of the own vehicle 9 in accordance with various traffic congestion situations that may occur in the right turn lane 130a of the lane change destination.

In addition, the other lane determination unit 112 of the travel control device 200 determines a lane extending in a direction intersecting the traveling lane as the other lane on the planned traveling route. Thus, it is possible to control the motion of the own vehicle 9 in response to various congestion situations that may occur when the own vehicle 9 makes a right turn or a left turn at an intersection or T-shaped road as well as when the own vehicle changes lanes to a branch adjacent to the traveling lane 140. In this embodiment, the other lane determination unit 112 determines the right turn lane 130a as the other lane on the planned traveling route, but the present invention is not limited to this, and when the own vehicle 9 turns left, the left turn lane 130b may be determined as the other lane on the planned traveling route.

Further, the turning travel area detection unit 118 detects each of the turning travel areas H1 and H2 necessary for the own vehicle 9 to swing the head and turn between the current position of the own vehicle 9 and each of the target positions P5 to P8. Then, the target posture setting unit 18 and the target traveling trajectory generation unit 19 set the target posture and each of the target traveling trajectory R5 to R8 at each of the target positions P5 to P8 on the basis of the shape of each of the approach spaces A5 to A8 and the shape of each of the turning travel areas H1 and H2. Thus, when the own vehicle 9 moves from the traveling lane 140 to the rearmost end of the traffic congestion line of the right turn lane 130a, the travel control device 200 can set more optimal target posture and each of the target traveling trajectories R5 to R8 in accordance with the traffic conditions and surrounding conditions.

Further, as shown in FIG. 12, when the approach space A7 meets the predetermined condition and the curb stone 150 is provided at the boundary on the sidewalk side of the right turn lane 130a, the travel control device 200 sets the target posture so that the yaw angle of the target posture of the own vehicle 9 is smaller than when the curb stone is not provided. Thus, it is possible to reduce the anxiety of the occupant worrying about the own vehicle 9 riding up the curb stone 150 by preventing the own vehicle 9 from facing the curb stone 150 as much as possible. The obstacle detected by the surrounding obstacle detection unit 17 is not limited to the curb stone 150, and may be a guard rail, a wall, or the like.

Further, as shown in FIG. 12, when the approach space detection unit 16a detects the approach space A8, the yaw angle of the target posture of the own vehicle 9 is 0 degrees. That is, the yaw angle of the target posture of the own vehicle 9 is smaller as the approach space detected by the approach space detection unit 16a is larger. Therefore, when the curb stone 150 is provided at the boundary on the sidewalk side of the right turn lane 130a, the setting of the detection standard of the approach space may be changed as appropriate in order to reduce the angle of the own vehicle 9 with respect to the curb stone 150 as much as possible.

Further, similarly to the travel control device 100, the travel control device 200 sets the upper limit of the trajectory curvature of the own vehicle 9 higher than the predetermined upper limit of the specified trajectory curvature when each of the approach spaces A5 to A8 meets the predetermined conditions. Thus, the own vehicle 9 travels along each of the target traveling trajectories R5 to R8, which are different from the normal traveling trajectory, to take the target posture corresponding to various yaw angles at each of the target positions P5 to P8.

In this embodiment, the approach space determination unit 16b determines whether or not each of the approach spaces A5 to A8 meets a predetermined condition based on the position of the rear end 8a of the other vehicle 8, but the present invention is not limited thereto. That is, when it is determined that traffic congestion is occurred in the right turn lane 130a, the approach space determination unit 16b may determine whether or not the own vehicle 9 can be accommodated in each of the approach spaces A5 to A8 without inclining the vehicle body while decelerating to a predetermined vehicle speed or less, and may determine that each of the approach spaces A5 to A8 meets the predetermined condition when it is determined that the own vehicle 9 cannot be accommodated in each of the approach spaces A5 to A8 without inclining the vehicle body.

The branch 30 and the right turn lane 130a correspond to other lane according to the present invention. The branch determination unit 12 corresponds to the other lane determination unit according to the present invention.

DESCRIPTION OF REFERENCE NUMERALS 100,200 . . . Travel control device
8 . . . Other vehicle
9 . . . Own vehicle
12 . . . Branch determination unit (Other lane determination unit)
14 . . . Traffic congestion determination unit
16a . . . Approach space detection unit
16b . . . Approach space determination unit
18 . . . Target posture setting unit
19 . . . Target traveling trajectory generation unit
20 . . . Route tracking control unit
30 . . . Branch (the other lane)
35,135 . . . Entrance boundary line
40,140 . . . Travelling lane
50 . . . Obstacle
112 . . . Other lane determination unit
130a . . . Right turn lane (the other lane)
A1,A2,A3,A4,A5,A6,A7,A8 . . . Approach space
H1, H2 . . . Turning travel area
L1, L2, L3 . . . Rearmost section
P1,P2,P3,P4,P5,P6,P7,P8 . . . Target position
R1,R2,R3,R4,R5,R6,R7,R8 . . . Target traveling trajectory
θ1,θ2 . . . Inclination angle of the entrance boundary line
θy1, θy2, θy3, θy4 . . . Yaw angle
X . . . Threshold angle

The invention claimed is:

1. A travel control method for a vehicle, the method including detecting a surrounding situation of an own vehicle that travels autonomously and controlling a motion of the own vehicle based on the surrounding situation, comprising:
    determining whether a planned traveling route of the own vehicle includes another lane different from a traveling lane, the own vehicle traveling autonomously in the traveling lane;
    detecting, behind another vehicle in the other lane, a shape of an approach space that is present between a rear end of the other vehicle and a boundary line set at a branch from the traveling lane to the other lane;
    determining whether the shape of the approach space meets a predetermined condition,
    when determining that the shape of the approach space does not meet the predetermined condition, setting, along a lane direction of the other lane, a target posture of the own vehicle at a target position behind the other vehicle in the other lane;
    when determining that the shape of the approach space meets the predetermined condition, setting the target posture of the own vehicle at the target position behind the other vehicle in the other lane based on the shape of the approach space so that a protruding amount is equal to or less than a predetermined value, the protruding amount indicating an amount by which the own vehicle protrudes from the boundary line of the other lane;
    generating a target traveling trajectory from a current position of the own vehicle to the target position so that the own vehicle takes the target posture at the target position; and
    controlling the motion of the own vehicle so that the own vehicle tracks the target traveling trajectory.

2. The travel control method for a vehicle according to claim 1, further comprising:
    when determining that the shape of the approach space meets the predetermined condition, setting the target posture of the own vehicle at the target position behind the other-vehicle in the other lane to a posture inclining to the lane direction of the other lane so that the protruding amount is equal to or less than the predetermined value.

3. The travel control method for a vehicle according to claim 1, further comprising:
    when the shape of the approach space meets the predetermined condition, setting an upper limit of trajectory curvature of the own vehicle higher than a predetermined upper limit of trajectory curvature to generate the target traveling trajectory from the current position of the own vehicle to the target position.

4. The travel control method for a vehicle according to claim 1, wherein the other lane is a lane extending in a direction intersecting the traveling lane.

5. The travel control method for a vehicle according to claim 4, further comprising:
    detecting a turning travel area necessary for the own vehicle turning to swing a head between a current position of the own vehicle and the target position, and
    setting the target posture at the target position and the target traveling trajectory based on the shape of the approach space and a shape of the turning travel area.

6. The travel control method for a vehicle according to claim 1, further comprising:
    when the shape of the approach space meets the predetermined condition, determining whether an obstacle exists in front of the own vehicle entering the approach space; and
    when determining that the obstacle exists, setting the target posture of the own vehicle so that a yaw angle of the own vehicle in the approach space is smaller than when determining that the obstacle doesn't exist.

7. The travel control method for a vehicle according to claim 6, further comprising:
    setting the target posture of the own vehicle so that a yaw angle of the own vehicle in the approach space is smaller as height of the obstacle is higher.

8. The travel control method for a vehicle according to claim 1, further comprising:
    when determining that the planned traveling route includes the other lane, determining whether traffic is present in the other lane, and
    detecting, behind the other vehicle in the other lane, the shape of the approach space that is present between the rear end of the other vehicle and the boundary line set at the branch from the traveling lane to the other lane is performed in response to determining that the traffic is present in the other lane.

9. The travel control method for a vehicle according to claim 8, further comprising:
    when determining that the traffic is present in the other lane, determining whether the own vehicle can be accommodated in the approach space without inclining a vehicle body in a state where the own vehicle is decelerated to a predetermined vehicle speed or less,
    when determining that the own vehicle cannot be accommodated in the approach space without inclining the vehicle body, determining that the shape of the approach space meets the predetermined condition.

10. The travel control method for a vehicle according to claim 8, wherein the other lane is a branch adjacent to the traveling lane.

11. The travel control method for a vehicle according to claim 10, further comprising:
when determining that the traffic is present on the branch adjacent to the traveling lane, determining whether the approach space includes a rearmost section at a predetermined interval or more in which the own vehicle can be accommodated without inclining a vehicle body in a state where the own vehicle decelerates to a predetermined vehicle speed or less, and
when determining that the approach space does not include the rearmost section at the predetermined interval or more, determining the shape of the approach space meets the predetermined condition.

12. The travel control method for a vehicle according to claim 10, further comprising:
when determining that the traffic is present on the branch adjacent to the traveling lane, determining whether it is predicted that a vehicle body of the own vehicle protrudes into the traveling lane beyond a predetermined amount, in a state in which the own vehicle travels based on a predetermined upper limit of trajectory curvature and decelerates to a predetermined vehicle speed or less to enter the approach space, and
when determining that it is predicted that the vehicle body of the own vehicle protrudes into the traveling lane beyond the predetermined amount, determining that the shape of the approach space meets the predetermined condition.

13. The travel control method for a vehicle according to claim 10, further comprising:
when the shape of the approach space meets the predetermined condition, setting the target posture of the own vehicle so that a yaw angle of the own vehicle in the approach space approaches an inclination angle of an entrance boundary line of the branch as the approach space is smaller.

14. The travel control method for a vehicle according to claim 10, further comprising:
when the shape of the approach space meets the predetermined condition, setting the target posture of the own vehicle so that a yaw angle of the own vehicle in the approach space approaches 0 degrees as the approach space is larger.

15. The travel control method for a vehicle according to claim 10, further comprising:
when the shape of the approach space meets the predetermined condition and when an inclination angle of an entrance boundary line of the branch is equal to or less than a predetermined threshold angle, setting the target posture of the own vehicle so that a yaw angle of the own vehicle in the approach space is smaller than the inclination angle of the entrance boundary line.

16. The travel control method for a vehicle according to claim 15, further comprising:
when the shape of the approach space meets the predetermined condition and when the inclination angle of the entrance boundary line of the branch is equal to or less than the predetermined threshold angle, setting the target posture of the own vehicle so that the yaw angle of the own vehicle in the approach space approaches 0 degrees as the approach space is larger.

17. The travel control method for a vehicle according to claim 8, wherein the traffic is determined to be present in the other lane based on the presence of the other vehicle in the other lane.

18. The travel control method for a vehicle according to claim 8, wherein the traffic is determined to be present in the other lane based on received traffic data.

19. A travel control device for a vehicle comprising:
a processor; and
a memory coupled to the processor, the memory storing instructions that, when executed by the processor, cause the processor to:
determine whether a planned traveling route of an own vehicle includes another lane different from a traveling lane, the own vehicle traveling autonomously in the traveling lane;
detect, behind another vehicle in the other lane, a shape of an approach space that is present between a rear end of the other vehicle and a boundary line set at a branch from the traveling lane to the other lane;
determine whether the shape of the approach space meets a predetermined condition;
when a determination is made that the shape of the approach space does not meet the predetermined condition, set, along a lane direction of the other lane, a target posture of the own vehicle at a target position behind the other vehicle in the other lane;
when a determination is made that the shape of the approach space meets the predetermined condition, set the target posture of the own vehicle at the target position behind the other vehicle in the other lane based on the shape of the approach space so that a protruding amount is equal to or less than a predetermined value, the protruding amount indicating an amount by which the own vehicle protrudes from the boundary line of the other lane;
generate a target traveling trajectory from a current position of the own vehicle to the target position so that the own vehicle takes the target posture at the target position; and
control a motion of the own vehicle so that the own vehicle tracks the target traveling trajectory.

* * * * *